3,397,998
METHOD FOR PRODUCING POURABLE REFRIGERATED MARGARINE
William E. Fricks, Cedartown, Ga., assignor to Fricks Foods, Inc., Cedartown, Ga., a corporation of Georgia
No Drawing. Filed Oct. 20, 1964, Ser. No. 405,289
2 Claims. (Cl. 99—123)

ABSTRACT OF THE DISCLOSURE

A method of converting conventional margarine which normally is solid at room temperature in to a form which is pourable at less than 40° F., said method comprising: providing a quantity of said conventional margarine refrigerated to solid condition at about 40° F.; adding thereto a substantially equal quantity of edible vegetable oil which remains liquid at about 40° F.; subjecting the mixture to violent stirring action at about one to ten minutes and refrigerating the mixture thus formed to between about 38° F. and about 40° F.

---

This invention relates to a method for producing pourable refrigerated margarine.

An object of the present invention is to provide a method for producing a pourable refrigerated margarine which retains its pourability while under refrigeration at a temperature of 38° to 40° Fahrenheit.

Another object of the present invention is to provide a method for producing a pourable refrigerated margarine from solid refrigerated margarine.

A further object of the present invention is to provide a method for producing a pourable refrigerated margarine which lends itself to packaging in dispensing containers, and which, while under refrigeration at a temperature of 38° to 40° Fahrenheit in such containers, may be dispensed in a pourable state at the will of the user.

Hence, the invention provides a product which may be obtained from freshly prepared or already prepared solid refrigerated margarine; which, by virtue of its pourability, may be packaged in suitable dispensing containers, and when such containers have been refrigerated to a temperature of 38° to 40° Fahrenheit, may be readily dispensed while under refrigeration in the pourable state by a user; and which retains not only its pourable condition while under refrigeration, but also its complete state of emulsification under refrigeration or at room temperature.

The invention will be completely understood by reference to the following examples:

EXAMPLE 1

A quantity of a blend of cottonseed and soybean oil is prepared by placing equal parts of cottonseed and soybean oil of a melting point of approximately 90.4° Fahrenheit in a mixture provided with a stirrer, and then heating the oils to about 150° Fahrenheit while gently agitating same by causing the stirrer to rotate at a speed of approximately 125 revolutions per minute.

Approximately 12.8 ounces of this blend is placed in a vessel provided with a stirrer, and the blend is then heated to about 150° Fahrenheit, whereupon the blend is being maintained at the aforesaid temperature, there is added thereto, in turn, about one-quarter of an ounce of iodine free salt in a finely divided state, and an emulsifier consisting of oil soluble mono and diglycerides with a negligible amount of lecithin in quantity of about sixtenths of an ounce, and coloring and flavoring to suit. This mass is then caused to be agitated by the stirrer until it is thoroughly mixed, whereupon the heating is discontinued, and the temperature of the mass reduced quickly to about 90° Fahrenheit while continuously agitating the mass by rotating the stirrer at a speed of 125 revolutions per minute so as to prevent lumping. At this point, and while the mass is being agitated, about 2.8 ounces of dry milk and water mix—water 9% and milk 1%—is added, and this mix thoroughly blended with the mass by causing the stirrer to rotate at approximately 200 revolutions per minute.

To the blended mass, while still being agitated by the increased speed of rotation of the stirrer, is added, in turn, a preservative such as sodium benzoate in quantity of about one-tenth of an ounce, vitamin B, vitamin A in quantity of about 15,00 units, and citric acid in quantity sufficient to protect the flavor. At the conclusion of these additions the temperature of the resultant liquid mass is reduced to approximately 68° Fahrenheit, and the liquid mass poured into molds. After the mass in the molds has set, the molds are placed in the refrigerator and cooled to 38° to 40° Fahrenheit, resulting in a solid stable homogeneous emulsified refrigerated margarine which is ready for table or cooking uses. The above-described procedure constitutes one method whereby conventional margarine may be produced.

The thus prepared solid stable homogeneous emulsified refrigerated margarine may be converted by subjecting same to the method of the present invention into a stable emulsified margarine having a pourable consistency when refrigerated or cooled to 38° to 40° Fahrenheit, and which retains such consistency when so refrigerated, thereby enabling the margarine to be dispensed from containers, squeeze bottles, and the like.

In carrying out the method according to the present invention one pound of the above prepared margarine in its solid refrigerated state is placed in a vessel provided with a sturdy and high-speed stirrer, and also, added to this vessel is substantially the same quantity or about one pound of a liquid edible vegtable oil-like safflower oil. This mixture is subjected to an intensive agitation action by causing the stirrer to rotate at a speed of from 1725 to 3650 revolutions per minute and for a time interval from one to ten minutes. This agitation action causes the mass to be converted into a semi-solid or pourable condition when refrigerated to 40° Fahrenheit, while retaining its stable emulsified state. This pourable mass is then bottled in suitable containers or squeeze bottles and placed in the refrigerator to be cooled to about 38° to 40° Fahrenheit.

EXAMPLE 2

A quantity of margarine of the conventional type is made according to the process of Example 1, but the quantity of the starting oil or oils employed is provided by cottonseed and corn oil of a melting point of approximately 85° Fahrenheit.

The resultant solid stable emulsified margarine refrigerated to about 40° Fahrenheit is treated according to the method of the present invention as specifically set forth in Example 1, but liquid vegetable oil like soybean oil of the salad oil type is employed, resulting in a pourable mass, when refrigerated to about 40° Fahrenheit, and which retains its pourability when so refrigerated and its state of stable emulsification.

EXAMPLE 3

A quantity of margarine of the conventional type is made according to the process of Example 1, but the quantity of the starting oil or oils employed is provided by corn oil of melting point of approximately 89° Fahrenheit.

The resultant solid stable emulsified margarine refrigerated to about 40° Fahrenheit is treated according to the method of the present invention as specifically set forth in Example 1, but a liquid vegetable oil like winterized cottonseed oil is employed, resulting in a pourable mass when refrigerated to about 40 Fahrenheit and which retains its pourability when so refrigerated and its state of stable emulsification.

EXAMPLE 4

A quantity of margarine of the conventional type is made according to the process of Example 1, but the quantity of the starting blend employed is that of animal fat with a suitable melting point.

The resultant solid stable emulsified margarine refrigerated to about 40° Fahrenheit is treated according to the method of the present invention as specifically set forth in Example 1, but the liquid vegetable oil like soybean of the salad oil type is employed, resulting in a pourable mass, when refrigerated to about 40° Fahrenheit, and which retains its pourability when so refrigerated and its state of stable emulsification.

What is claimed is:

1. A method of converting conventional margarine which normally is solid at room temperature into a form which is pourable at less than 40° F., said method comprising: providing a quantity of said conventional margarine refrigerated to solid condition at about 40° F.; adding thereto a substantially equal quantity of edible vegetable oil which remains liquid at about 40° F.; subjecting the mixture to violent stirring action at between substantially 1725 to substantially 3650 r.p.m. for not more than ten minutes and refrigerating the mixture thus formed to between about 38° F. and about 40° F.

2. A method according to claim 1, wherein said vegetable oil is selected from the group consisting of safflower oil, soybean oil of the salad oil type, winterized cottonseed oil.

References Cited

UNITED STATES PATENTS 2,846,312  8/1958  Lantz et al. _____ 99—118

MAURICE W. GREENSTEIN, *Primary Examiner.*